US006938301B2

(12) United States Patent
Brooke et al.

(10) Patent No.: US 6,938,301 B2
(45) Date of Patent: Sep. 6, 2005

(54) BED FRAME

(75) Inventors: Jason C. Brooke, Mount Pleasant, SC (US); Kendall O. Shows, Summerville, SC (US); William S. Larisey, Jr., Summerville, SC (US); Robert E. Anderson, Charleston, SC (US); Daniel C. Hillenbrand, Batesville, IN (US); Joe D. McGuinness, Goose Creek, SC (US)

(73) Assignee: Hill-Rom Services, Inc., Wilmington, DE (US)

( * ) Notice: Subject to any disclaimer, the term of this patent is extended or adjusted under 35 U.S.C. 154(b) by 190 days.

(21) Appl. No.: 10/085,894

(22) Filed: Feb. 28, 2002

(65) Prior Publication Data

US 2002/0078505 A1 Jun. 27, 2002

Related U.S. Application Data

(62) Division of application No. 09/323,184, filed on May 28, 1999, now Pat. No. 6,351,861.

(60) Provisional application No. 60/087,321, filed on May 29, 1998.

(51) Int. Cl.[7] .................................... B60B 33/06

(52) U.S. Cl. ........................ 16/42 T; 16/34; 16/19; 108/177

(58) Field of Search ....................... 16/32–34, 42 R, 16/42 T, 19, 18 R, 29; 5/86.1; 108/177, 189

(56) References Cited

U.S. PATENT DOCUMENTS

| | | | | | |
|---|---|---|---|---|---|
| 184,342 | A | * | 11/1876 | Cogger | 16/34 |
| 746,636 | A | * | 12/1903 | Lawrence | 16/34 |
| 1,058,837 | A | * | 4/1913 | Zikmund | 16/34 |
| 2,126,811 | A | | 8/1938 | Rambo et al. | |
| 2,520,849 | A | | 8/1950 | McVicker | |
| 2,663,048 | A | * | 12/1953 | Ross, Jr. et al. | 16/34 |
| 2,722,017 | A | | 11/1955 | Burst et al. | |
| 3,323,145 | A | | 6/1967 | Wiler et al. | |
| 3,506,989 | A | | 4/1970 | Ross et al. | |
| 3,585,659 | A | | 6/1971 | Burst et al. | |
| 3,821,821 | A | | 7/1974 | Burst et al. | |
| 3,965,500 | A | | 6/1976 | Stein | |
| 4,025,972 | A | | 5/1977 | Adams et al. | |
| 4,054,096 | A | * | 10/1977 | Wilson et al. | 108/169 |
| 4,097,939 | A | | 7/1978 | Peck et al. | |
| 4,097,940 | A | | 7/1978 | Tekulve et al. | |
| 4,417,738 | A | * | 11/1983 | Kendall | 280/43.17 |

(Continued)

FOREIGN PATENT DOCUMENTS

| | | | | | |
|---|---|---|---|---|---|
| DE | G 92 08 738.8 | | | 10/1992 | |
| DE | G 94 06 726.0 | | | 8/1994 | |
| EP | 0 214 695 | A2 | | 3/1987 | |
| GB | 2026070 | A | * | 1/1980 | E06C/5/32 |
| GB | 2 152 365 | A | | 8/1985 | |
| WO | WO 80/01979 | | | 10/1980 | |
| WO | WO 99/02069 | | | 1/1999 | |

*Primary Examiner*—Chuck Y. Mah
*Assistant Examiner*—Michael J Kyle
(74) *Attorney, Agent, or Firm*—Bose McKinney & Evans LLP

(57) ABSTRACT

A bed frame includes a base frame, an articulated support decks, an intermediate frame positioned between the base frame and the articulated support deck, and an auto-contour mechanism. The articulated support deck includes head, seat and foot deck portions. When engaged, the auto-contour mechanism adjusts the elevation of the seat deck portion and the foot deck portion in response to an adjustment of the head deck portion. The auto-contour mechanism is easily engaged/disengaged by manipulating a control lever. The bed frame can include siderails which are provided with a latching mechanism. The bed frame can also include a caster assembly that allows casters to be pivoted in an engaged position in which the bed frame rests on the casters, and a disengaged position in which the bed frame rests on legs.

17 Claims, 11 Drawing Sheets

U.S. PATENT DOCUMENTS 4,559,655 A 12/1985 Peck
4,627,120 A 12/1986 Harris
4,747,171 A 5/1988 Einsele et al.
4,783,879 A * 11/1988 Weaver ........................ 16/34
4,821,351 A 4/1989 Bergenwall
4,985,946 A 1/1991 Foster et al.
4,993,089 A 2/1991 Solomon et al.
5,245,718 A 9/1993 Krauska
5,317,769 A * 6/1994 Weismiller et al. ............ 5/610
5,347,682 A 9/1994 Edgerton
5,377,372 A 1/1995 Rudolf et al.
5,615,451 A 4/1997 Peterson et al.
5,708,997 A 1/1998 Foster et al.
5,832,549 A 11/1998 Le Pallec et al.
5,878,452 A 3/1999 Brooke et al.
5,924,168 A * 7/1999 Webb et al. .................. 16/30
6,006,379 A 12/1999 Hensley
6,427,963 B1 * 8/2002 Davis et al. ................ 248/519

* cited by examiner

BED FRAME

RELATED APPLICATIONS

This application is a divisional of U.S. application Ser. No. 09/323,184, filed May 28, 1999 now U.S. Pat. No. 6,357,861, which claims the benefit of U.S. Provisional Application Ser. No. 60/087,321, filed May 29, 1998, the complete disclosures of which are expressly incorporated herein by reference.

BACKGROUND AND SUMMARY OF THE INVENTION

The present invention relates to a bed frame, and particularly to a bed frame that can be placed into different support configurations. More particularly, the present invention relates to a bed frame having a base frame and an articulated support deck vertically movable relative to the base frame.

Beds which are used in hospitals, nursing homes and other health care facilities and in home heath care use typically include frames that have articulated support surfaces. In addition, some beds include intermediate frame structures which allow the height of the support surfaces to be adjusted. Beds which incorporate a number of features such as articulated support surfaces and a height adjusting mechanism can be relatively expensive.

The present invention provides bed frames having various features that can be economically manufactured to lower the costs thereof.

According to other features, characteristics, embodiments and alternatives of the present invention which will become apparent as the description thereof proceeds below, the present invention provides a bed frame which includes a base frame, an articulated support deck including at least a head deck portion, a seat deck portion and a foot deck portion, and an intermediate frame positioned between the base frame and the articulated support deck. The intermediate frame can be manipulated to raise and lower the articulated support deck with respect to the base frame. The bed frame also includes a selectively disengageable auto-contour mechanism which, when engaged, adjusts the elevation of the seat deck portion and the foot deck portion in response to an adjustment of the head deck portion.

The present invention also provides a siderail assembly for a bed which includes a siderail barrier pivotably movable into a first position in which it extends higher than a support surface of a bed and into a second position in which is no higher than level with the support surface of the bed, a pair of support arms pivotally coupled between the siderail barrier and a bed frame, a pair of linkage arms rigidly coupled to the pair of support arms, a connection arm coupled between the pair of linkage arms, and a latch mechanism coupled to one of the pair of linkage arms which can be engaged to secure the siderail barrier in the first position.

The present invention further provides a caster assembly for a bed frame which includes casters which are coupled to support shafts, support bars which are rigidly attached to the support shafts and pivotally coupled to frame members of a bed frame, and locking bars which are movable between a first position in which portions of the locking bars engage the support bars and lock the support shafts in a vertical position, and a second position in which the locking bars are clear of the support bars so that the support shafts are free to pivot about the frame members.

The present invention still further provides a bed including a base frame including a mounting portion having at least two side walls configured to define an opening therebetween, a caster including a wheel and a housing having a top surface located above the wheel, and an upstanding mounting plate coupled to the top surface of the housing. The mounting plate is configured to be inserted into the opening in the mounting portion. The bed also includes a fastener configured to secure the mounting plate to the mounting portion of the base frame.

The present invention further provides a bed which includes various combinations of the bed frame, siderail assembly and caster assembly.

BRIEF DESCRIPTION OF DRAWINGS

The present invention will be described hereafter with reference to the attached drawings which are given as non-limiting examples only, in which.

DETAILED DESCRIPTION OF THE DRAWINGS

The present invention is directed to bed frames, and particularly to bed frames which have base frames and articulated support decks that are vertically movable relative to the base frames. The bed frames of the present invention include articulated support decks which include at least head, seat and foot deck sections. The articulated support decks are supported on intermediate frames which can be manipulated to raise and lower the articulated support decks.

The bed frames of the present invention include auto-contour mechanisms which, when engaged, cause a pivot between the seat and foot deck sections to raise and lower in response to the raising and lowering of the head deck section. The auto-contour mechanism is designed to be easily disengageable by moving a lever which is coupled to and pivots a hooked engagement member.

The present invention also provides a siderail assembly which provides siderail barriers that can be pivoted between raised and lowered positions. The siderail assembly includes a parallelogram linkage and latch elements that can be easily manipulated to secure the siderail barrier in a raised position or to release the siderail barrier so that it can be lowered and stored.

The present invention also provides a caster assembly having casters which are pivotally coupled to a portion of the bed frame. A pivotal locking bar can be moved into an operable position in which the casters support the bed frame, and in an inoperable position in which the bed frame rests on legs. The locking bar can be operated by a fool pedal.

Figures 1, 2:
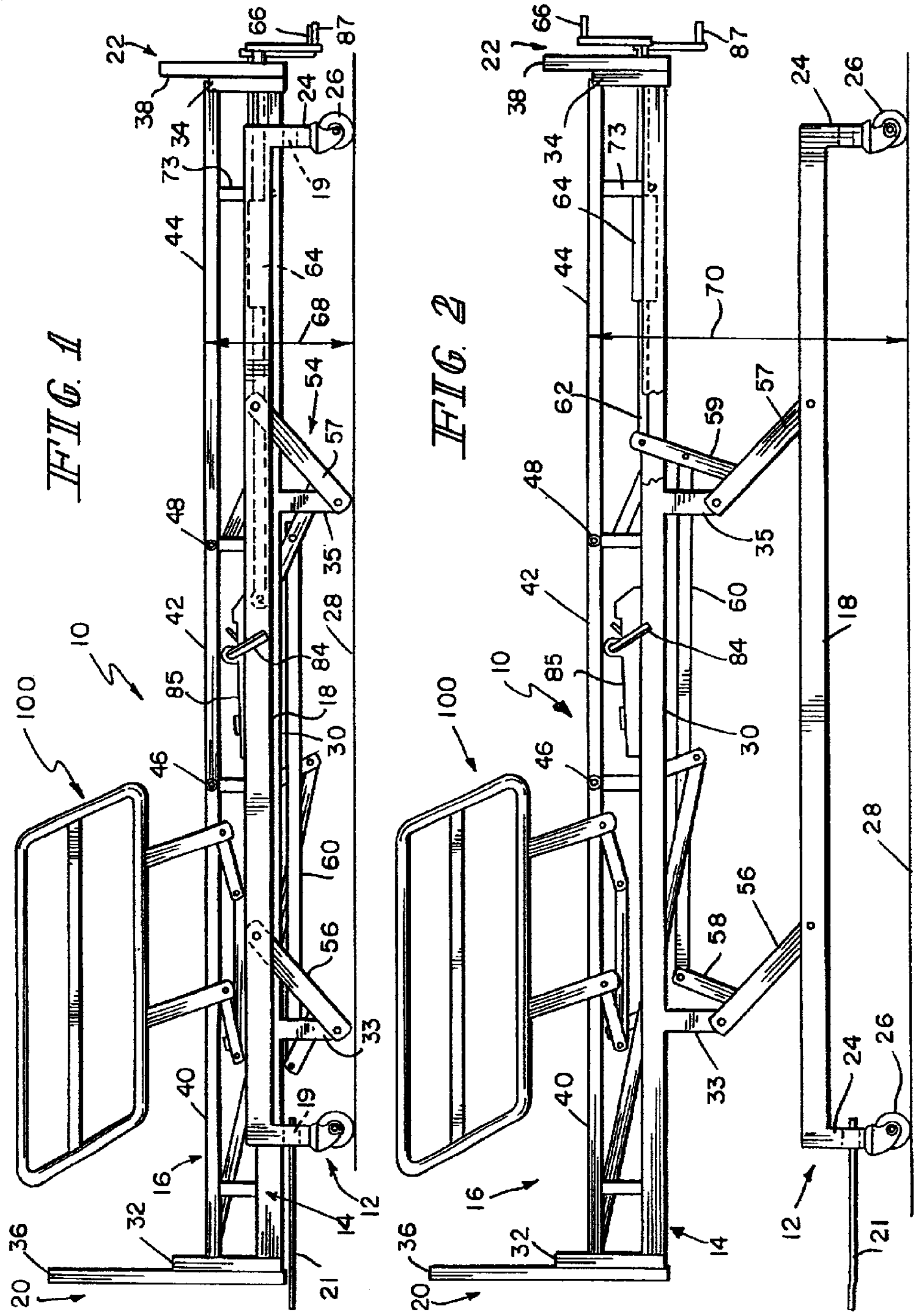
FIG. 1 is a side view of a bed frame according to one embodiment of the present invention.
FIG. 2 is a side view of the bed frame of FIG. 1, showing the intermediate frame elevated relative to the base frame.

FIG. 1 is a side view of a bed frame according to one embodiment of the present invention. The bed frame 10 includes a base frame 12, an intermediate frame 14, and an articulated support deck 16. As depicted, bed frame 10 can include a headboard 36 and a footboard 38 coupled to intermediate frame 14, and siderails 100 coupled to opposite sides of the articulated support deck 16. Bed frame 10 can also include casters 26 coupled to base frame 12. Bed frame 10 is suitable for long term care. In this regard, articulated support deck 16 can be configured in a variety of positions. Moreover, intermediate frame 14 allows the height of articulated support deck 16 to be readily adjustable relative to the ground. As discussed in detail below, bed frame 10, which can be economically manufactured from standard rectangular and tubular steel components, and can include an auto-contour subassembly that is selectably and easily disableable.

Base frame 12 is illustratively formed generally as a rectangle with two longitudinally extending siderails 18 and two laterally extending end rails 19 adjacent a head end 20 and foot end 22 of bed frame 10. Base frame 12 further includes downwardly depending legs 24 at its four corners, and casters 26 coupled to legs 24 which enable bed frame 10 to roll along a support surface, e.g., ground 28. Rails 18 and 19 and legs 24 are illustratively formed from standard rectangular or tubular steel members that can welded, bolted or otherwise coupled together to form base frame 12.

A wall stop or bumper 21 is formed from a generally U-shaped rod and can be coupled to base frame 12 adjacent head end 20 by pins or bolts (not shown). Illustratively, opposite ends of U-shaped bumper 21 extend through spaced apart apertures in end rails 19. Bumper 21 keeps bed frame 10 away from wall surfaces so that movement of base frame 12, intermediate frame 14, and/or articulated support deck 16 cannot contact and damage the surface of an adjacent wall. Bumper 21 can be coupled to main frame 12 relatively low to ground 28 so that it will contact wall surfaces where they tend to be the strongest and often have protective molding. Furthermore, bumper 21 can be formed from cost-effective, readily available, standard components and can be installed at the final destination of bed frame 10.

Intermediate frame 14 is also illustratively formed with a generally rectangular shape, with two longitudinally extending siderails 30 and two laterally extending end rails (not shown) adjacent head end 20 and foot end 22. Intermediate frame 14 further includes upwardly extending head posts 32, adjacent head end 20, and upwardly extending foot posts 34 adjacent foot end 22. Intermediate frame 14 further includes two downwardly extending front support posts 33 and two downwardly extending rear support posts 35. Siderails 30, end rails (not shown), upwardly extending posts 32, 34, and downwardly extending posts 33 and 35 are illustratively formed from standard rectangular or tubular steel members that can be welded, bolted or otherwise coupled together to form intermediate frame 14. A headboard 36 can be coupled to posts 32 and a foot board 38 can be coupled to posts 34 by any conventional means such as pins or bolts (not shown).

Figure 22:
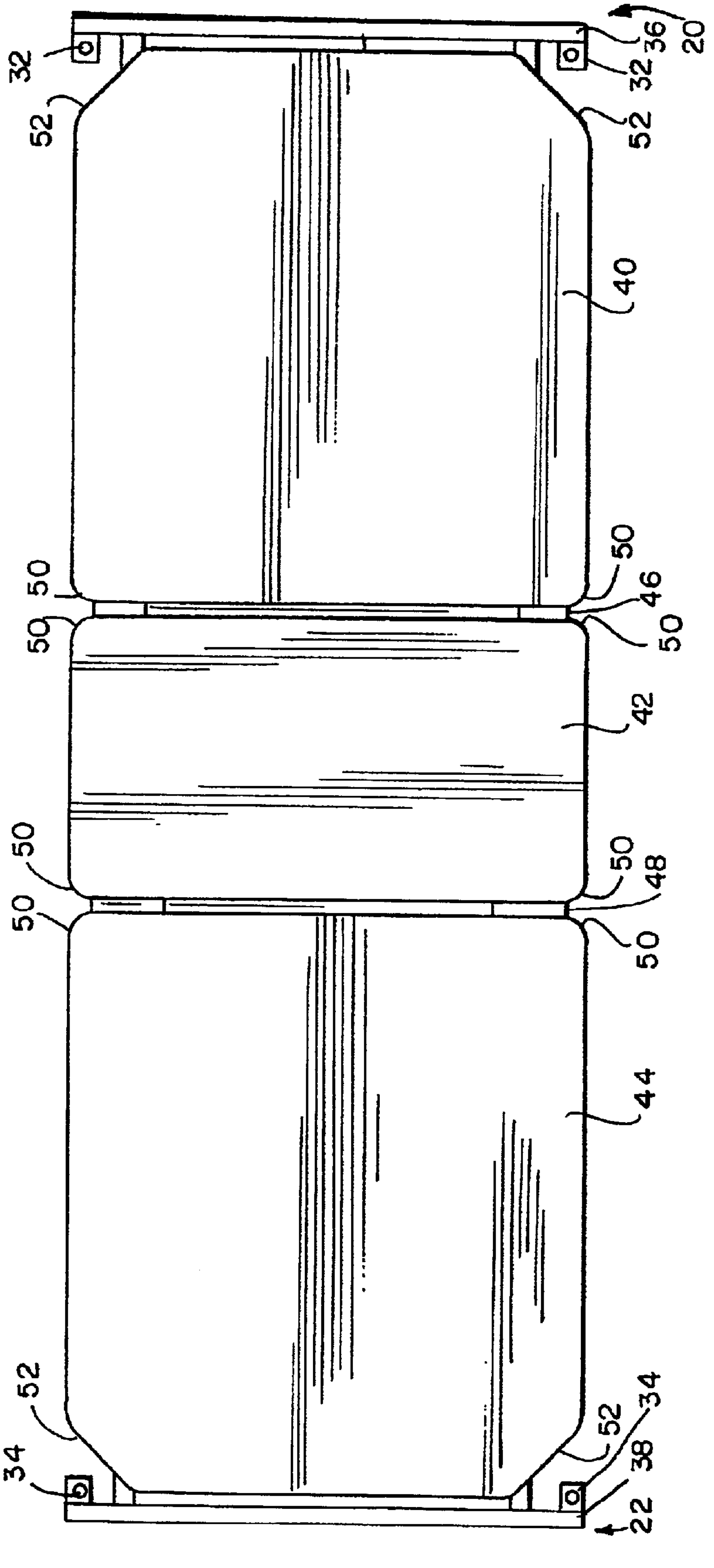
FIG. 22 is a plan view of a bed frame according to the present invention showing an articulated support deck having head, seat, and foot deck portions that are coupled together for articulation by pivots which are recessed from edges of the deck portions.

Articulated support deck 16 includes a head deck portion 40, a seat deck portion 42, and a foot deck portion 44 that are coupled together by a head-seat pivot 46 and a seat-foot pivot 48. Deck portions 40,42 and 44 have radiused corners 50 adjacent pivots 46 and 48 as shown in FIG. 22, which serve to reduce the possibility of pinching during articulation of articulated support deck 16. Head and foot deck portions 40 and 44 further have wedge-shaped corners 52 adjacent head and foot ends 20 and 22, respectively. Wedge corners 52 allow for access to end posts 32 and 34 which, when they are formed from tubes, can serve as sockets for an i.v. stand or other equipment (not shown). Wedge corners 52 illustratively allow the use of mattresses with different lengths on the deck.

FIG. 2 is a side view of the bed frame of FIG. 1, showing the intermediate frame elevated relative to the base frame. Intermediate frame 14 is coupled to base frame 12 by a frame linkage assembly 54 as best shown in FIG. 2. Frame linkage assembly 54 provides for raising and lowering of intermediate frame 14 with respect to base frame 12, and includes a parallelogram linkage having rotating support arms 56 and 57 pivotally coupled between base frame siderails 18 and the downwardly extending posts 33 and 35, respectively, coupled to intermediate frame siderails 30. Linkage assembly 54 further includes drive arms 58 and 59 that are rotatably coupled to support arms 56 and 57 respectively, and are coupled together by a parallel link arm 60. Drive arm 59 is coupled to a drive rod 62 which is in turn coupled to either a vertical adjustment drive screw 64 or optionally to a drive motor (not shown).

Drive screw 64 is coupled to a vertical bed adjustment handle 66 that is located adjacent foot end 22 and provides for a convenient mechanism for raising or lowering intermediate frame 14 relative to base frame 12. When either drive screw 64 or a drive motor (not shown) moves drive rod 62 generally horizontally, it causes drive arms 58 and 59 to rotate support arms 56 and 57 and move intermediate frame 14 in a generally vertical direction relative to base frame 12. This causes articulated support deck 16 to raise from a lowered position 68 as shown in FIG. 1 to a higher position 70 as shown in FIG. 2.

Figure 3:
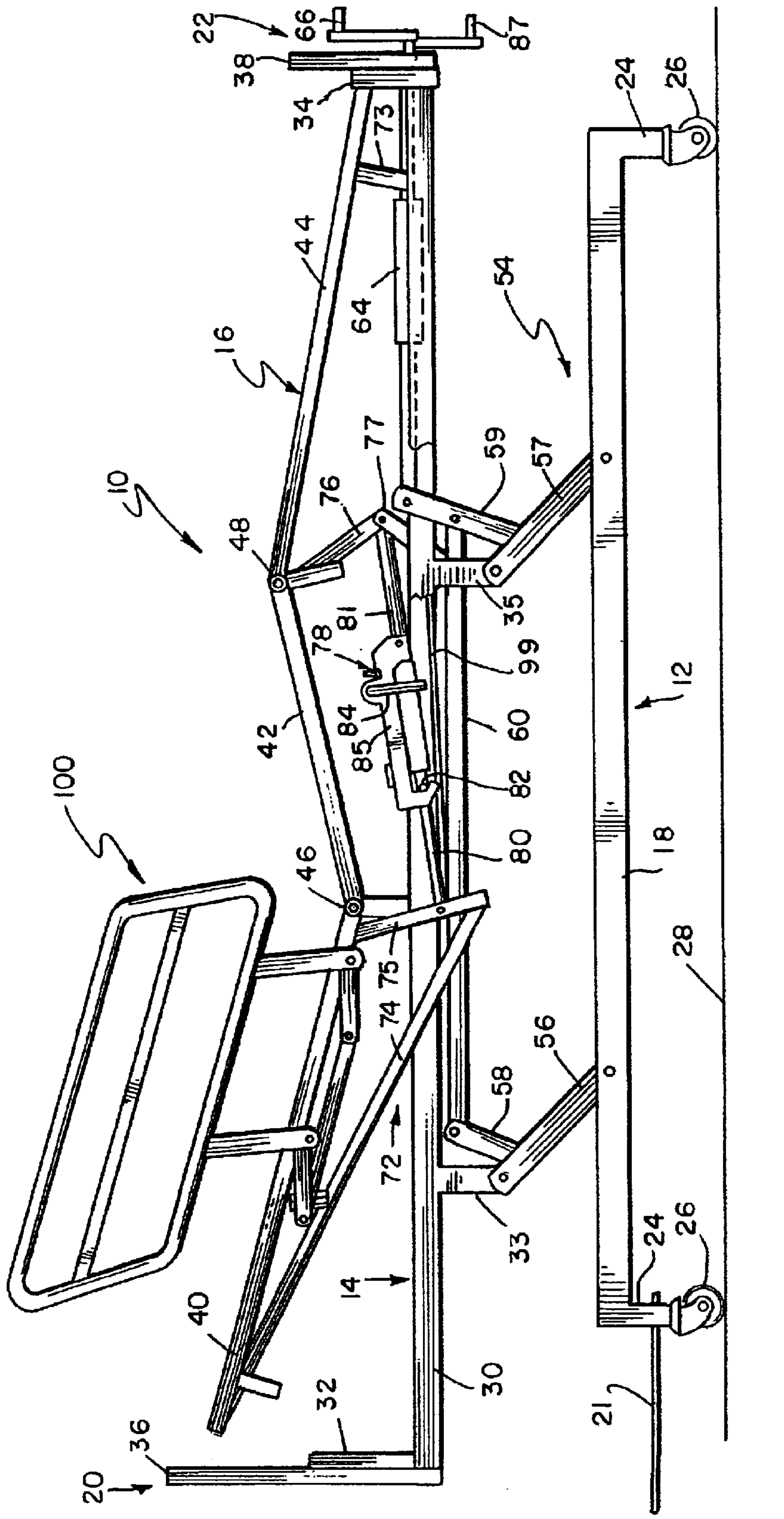
FIGS. 3–5 are side views of the bed frame of FIG. 1, showing the articulated support deck in progressively increasing non-planar positions with portions cut away to show the frame linkage assembly for movement of the intermediate frame relative to the base frame and a deck linkage assembly for articulated movement of the foot, seat, and head deck portions.
Figure 4:
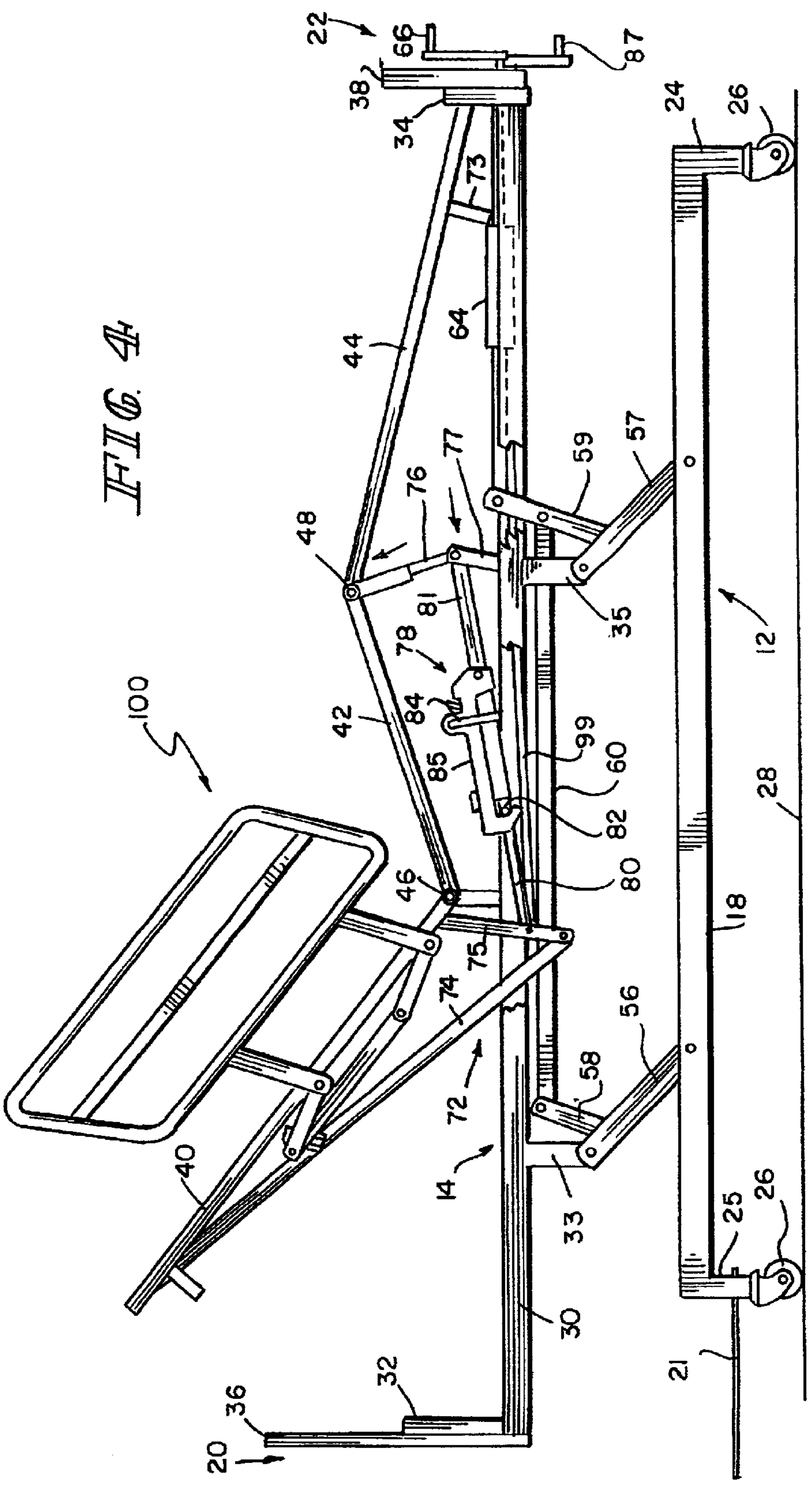
Figure 5:
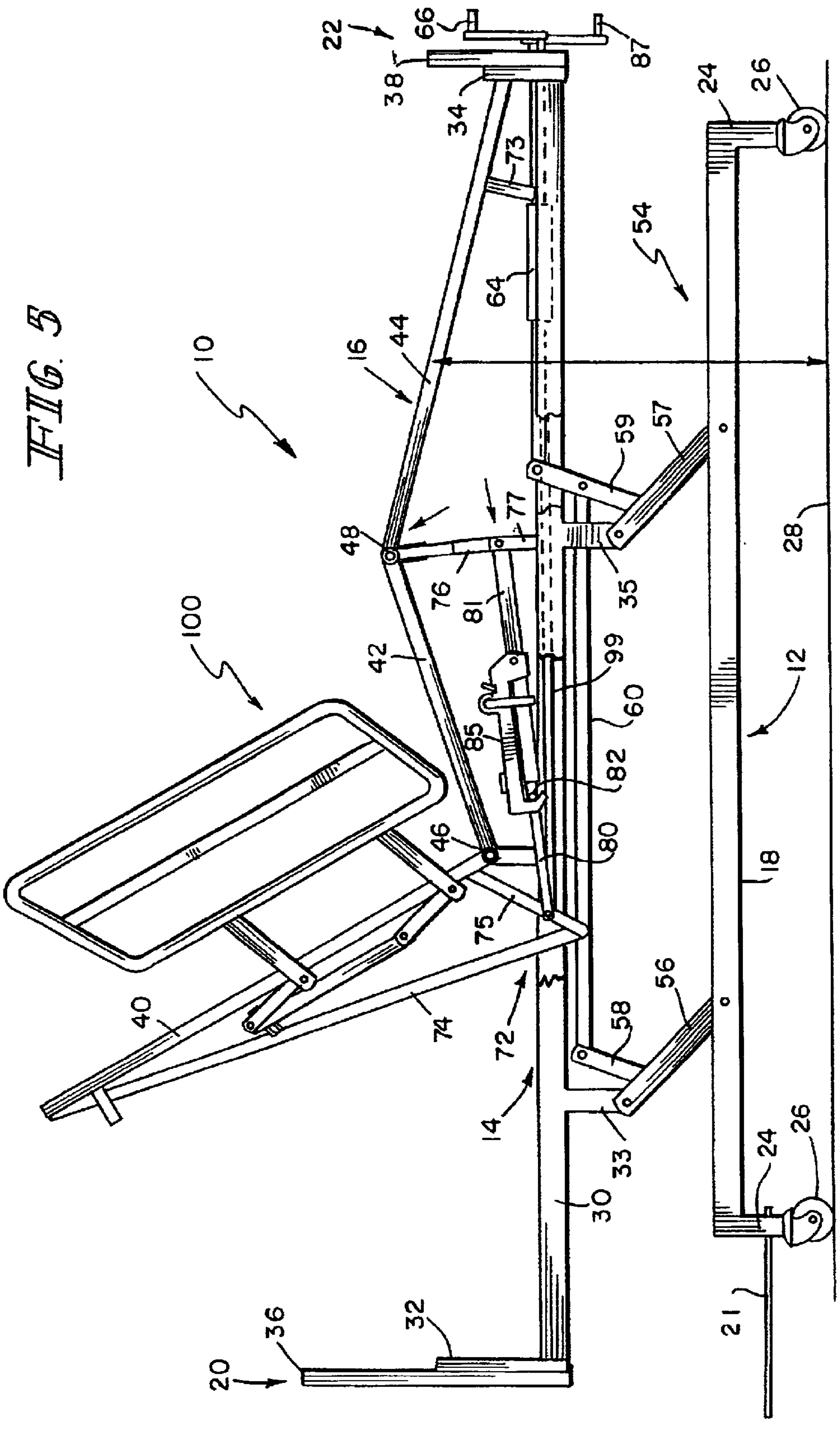

FIGS. 3–5 are side views of the bed frame of FIG. 1, showing the articulated support deck in progressively increasing non-planar positions with portions cut away to show a frame linkage assembly for movement of the intermediate frame relative to the base frame, and a deck linkage assembly for articulated movement of the foot, seat, and head deck portions.

Articulated support deck 16 is coupled to intermediate frame 14 by a deck linkage assembly 72 as shown FIGS. 3–5. Deck linkage assembly 72 includes three spaced apart head drive arms 74 having first ends coupled to head deck portion 40 adjacent head end 20. Three additional deck drive arms 75 are coupled to head deck portion 40 adjacent pivot 46. Opposite end of arms 75 are coupled to arms 74 at an acute angle as shown. Drive arms 74 and 75 are rigidly coupled both together and to head deck portion 40. Deck linkage assembly 72 also includes a drive arm 76 having a first end pivotally coupled to seat deck portion 42 and a second end which is pivotally coupled to drive arm 77. An opposite end of drive arm 77 is pivotally coupled to the intermediate frame 14. The common pivot connection of arms 76 and 77 is also coupled to a drive rod sleeve 81 of auto-contour engagement subassembly 78. Foot deck portion 44 is pivotally coupled to support arms 73 located adjacent opposite sides of foot deck portion 44. Opposite ends of arms 73 are pivotally coupled to siderails 30 of intermediate frame 14.

The progressive views of FIGS. 3–5 depict how the drive arms 76 and 77 pivot about their common pivotal point to raise seat-foot pivot 48 (and the adjacent ends of the seat deck portion 42 and foot deck portion 44), as the head deck portion 40 is inclined upward. When main drive arm 99 (discussed below) is moved in the direction of head end 20, it pushes against a central pair of drive arms 74 and 75 and thereby causes head deck portion 40 to pivot upward about head-seat pivot 46. As drive alms 75 rotate in an off-set manner about head-seat pivot 46, auto-contour engagement subassembly 78 pulls the pivotally connected ends of drive arms 76 and 77 so that they become substantially linearly aligned as shown in FIG. 5. In practice, it may be preferred to limit the drive arms 76 and 77 from being linearly aligned, since doing so may require an initial force to overcome forces which may tend to stabilize linear alignment. That is, when the drive arms 76 and 77 are not completely linearly aligned, the weight of the seat deck portion 42 and foot deck portion 44 will be sufficient to cause the drive arms 76 and 77 to pivot about their connected ends without any force applied by or through the auto-contour subassembly 78.

Figure 6:
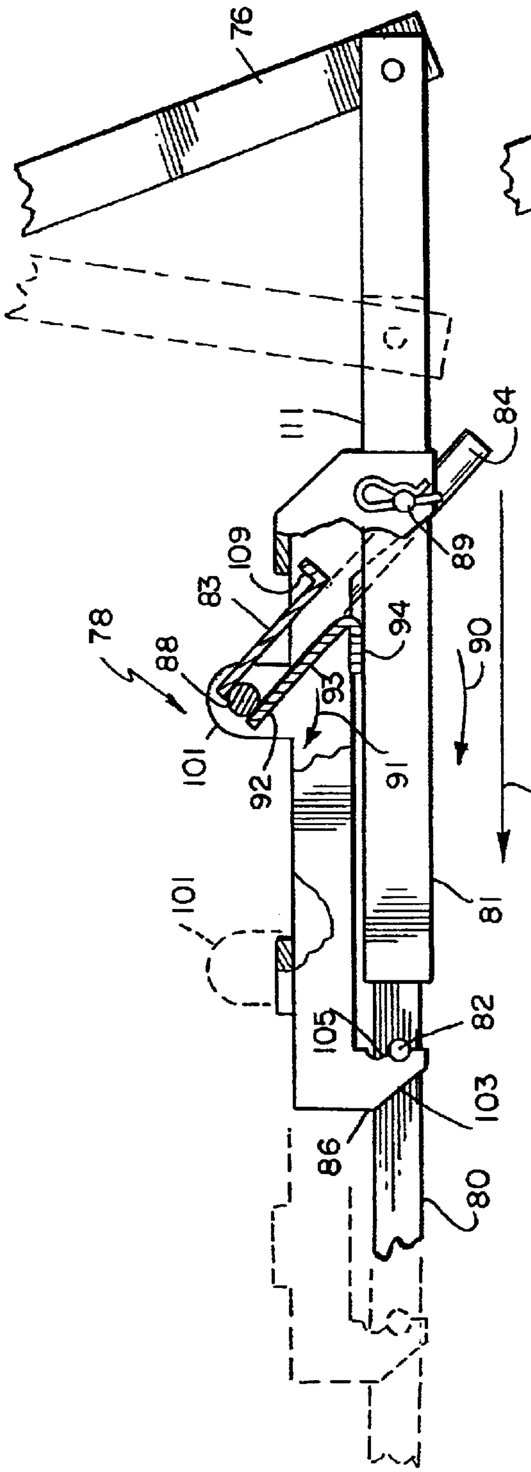
FIG. 6 is a side view of an auto-contour subassembly of the deck linkage assembly of FIGS. 3–5 in an engaged position.
Figure 7:
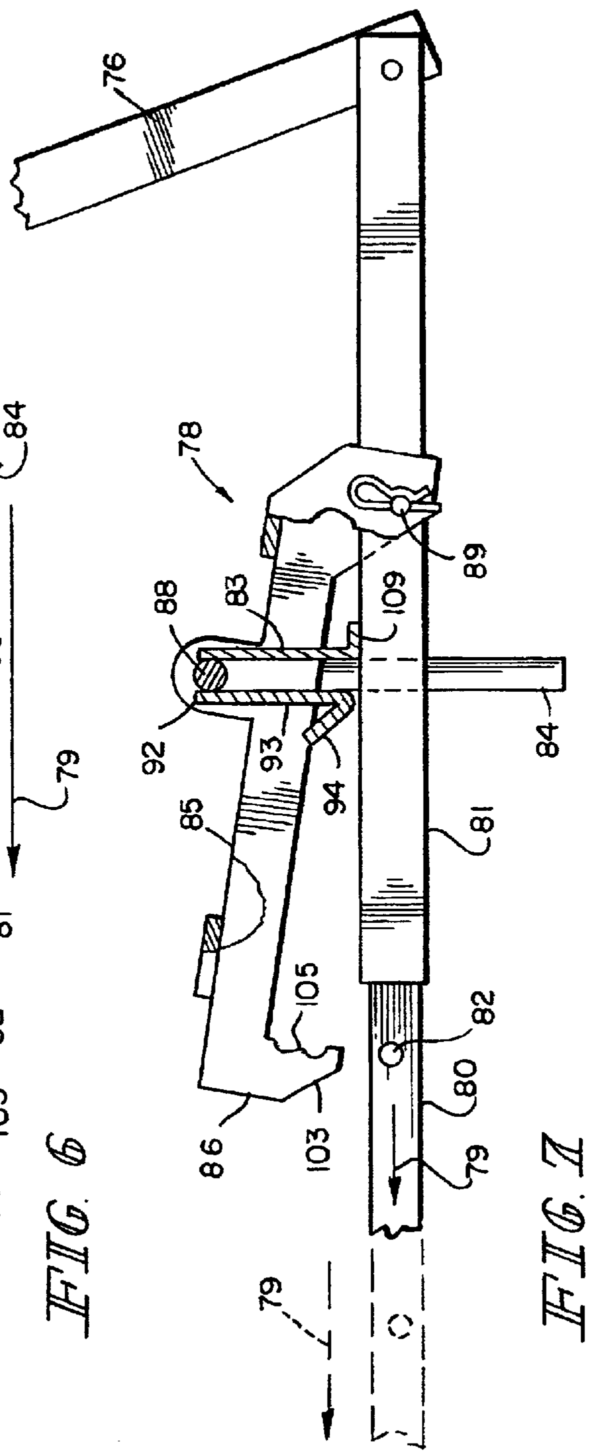
FIG. 7 is a side view of the auto-contour subassembly of FIG. 6 in a disengaged position.

When main drive arm 99 is moved in the direction of foot end 22, the weight of the head deck portion 40 causes head deck portion 40 to pivot downward about head-seat pivot 46. As drive arms 75 rotate in an off-set manner about head-seat pivot 46, the weight of the seat deck portion 42 and the foot deck portion 44 causes drive arms 76 and 77 to pivot about their connected ends. FIG. 6 is a side view of an auto-contour subassembly of the deck linkage assembly of FIGS. 3–5 in an engaged position. FIG. 7 is a side view of the auto-contour subassembly of FIG. 6 in a disengaged position. Auto-contour subassembly 78 provides for automatically elevating or lowering of the seat-foot pivot 48 as head deck section 40 is rotated up or down, respectively, with respect to intermediate frame 14.

Auto-contour subassembly 78 includes an auto-contour drive rod 80, a drive rod sleeve 81, an engagement pin 82 coupled to drive rod 80, a rotatable control lever 84, an L-shaped beam 83 coupled to the control lever 84, and an auto-contour engagement dog 85 as best shown in FIGS. 6 and 7. Drive rod 80 is pivotally coupled to at least one of the head deck section drive arms 75, and sleeve 81 is pivotally coupled to drive arms 76, 77 as best shown in FIG. 5. Central ones of head section arms 74, 75 are also pivotally coupled to a main drive arm 99 that in turn is coupled to either a manually cranked drive screw mechanism (not shown) operated by handle 87 or an electric motor (not shown) for pivoting the head deck section 40 up and down around pivot 46.

When the main drive arm 99 is moved toward head end 20 by the screw mechanism, the arms 74 and 75 are also pushed toward head end 20 to pivot the head deck portion 40 upwardly about pivot axis 46 to the elevated position of FIG. 5. When main drive arm 99 is moved in the direction of foot end 22 by the screw mechanism, arms 74 and 75 are pulled (or allowed to move under the gravitational forces acting on the head deck portion 40) toward foot end 22 which causes head deck portion 40 to pivot downwardly about pivot 46 to the generally planar position illustrated in FIGS. 1 and 2.

When head deck section 40 pivots upwardly around pivot 46, head deck section drive arm 75 pulls auto-contour drive rod 80 in direction 79 toward head end 20. Auto-contour engagement dog 85 is rotatably coupled to sleeve 81 by pivot pin 89. Dog 85 includes a hooked end 86 and a pair of spaced apart flanges 101 which are each formed to include apertures. Hooked end 86 includes a leading ramp portion 103 and a pin engaging surface 105. When hooked end 86 is latched over engagement pin 82 as shown in FIG. 6, drive rod 80 can pull sleeve 81 toward head end 20 of the bed frame 10 as rod 80 moves toward head end 20. This in turn causes the pivotal connection between seat-foot pivot drive arms 76 and 77 to move towards head end 20, causing drive arms 76 and 77 to cooperatively lift seat-foot pivot 48 with respect to pivot 46 and support arms 73.

Thus, when auto-contour engagement dog 85 is latched, and head deck section 40 is rotated upwardly around pivot 46, seat deck section 42 rotates upwardly around pivot 46. Conversely, as head deck section 40 rotates downwardly around pivot 46, seat deck section 42 rotates in a downward direction. Similarly, as seat deck section 42 rotates in a upwardly direction around pivot 46, foot deck section 44 rotates upwardly around support arms 73, and vice-versa. Thus, auto-contour mechanism automatically raises a person's knees as the head deck section 40 is elevated to reduce the likelihood that the person supported on articulated support deck 16 will slide toward the foot end 22 of the bed frame 10 as head deck section 40 is raised.

The auto-contour subassembly can be conveniently disengaged by manually manipulating control lever 84. Control lever 84 includes a central pivot portion 88 which extends through the apertures of flanges 101 to pivotally couple control lever 84 to dog 85. Support beam 83 is illustratively an L-shaped beam having a first leg coupled to the central pivot portion 88 of control lever 84. Stop 92 is a illustratively a V-shaped beam having a longer leg 93 that is coupled to the central pivot portion 88 of control lever 84. Lever 84 may have a square-shaped cross section, if desired. Opposite ends of control lever 84 extend downwardly from central pivot portion 88 to provide convenient grip handles outside siderails 30.

A second leg 109 of support beam 83 provides a stand configured to engage a top surface 111 of sleeve 81 to hold the hooked end 86 of dog 85 above the pin 82. Engagement dog 85 is coupled to sleeve 81 by pivot pin 89 at an end distal from hooked end 86. Rotating control lever 84 in direction 90 as shown in FIG. 6 causes a corresponding rotation of support beam 83 in direction 91 until leg 109 of support beam 83 is parallel to and rests on top surface 111 of sleeve 81 as shown in FIG. 7. In this configuration, support beam 83 pivots the engagement dog 85 upwardly so that hooked end 86 is held away from engagement pin 82 and the auto-contour subassembly is disengaged. Therefore, rotation of head deck section 40 around pivot 46 does not cause rotation of seat and foot deck sections 42, 44 around pivot 48. In other words, the seat and foot deck sections 42 and 44 remain in the generally planar positions as illustrated in FIGS. 1 and 2 when the head section 40 is elevated and the auto-contour subassembly is disengaged.

When drive rod 80 is pulled in the direction of arrow 79 by drive arm 75 as the head deck portion 40 of the bed frame 10 is elevated, rod 80 can slide within sleeve 81 past the elevated hooked end 86 of dog 85 to the dotted position shown in FIG. 7. If the auto-contour subassembly is moved to the engaged position while the head deck portion 40 of the bed frame 10 is elevated, the dog 85 will move to the position shown in FIG. 6. When rod 80 is moved toward the foot end of the bed, engagement pin 82 will strike ramped surface 103 and cause the dog 85 to pivot upwardly so as to permit the engagement pin 82 to move past the hooked end 86 and into the latched position shown in FIG. 6 with engaging surface 105 against engagement pin 82.

As depicted in FIG. 6, stop 92 includes a second shorter leg 94 which can rest on top surface 111 of sleeve 81 and align pin engaging surface 105 of hooked end 86 with engagement pin 82. The curved transition portion of stop 92 between longer leg 93 and shorter leg 94 can function as a cam surface to lift control lever 84 as it is rotated in the direction depicted in FIG. 6. Otherwise, one can manipulate control lever 84 by simultaneously lifting and rotating the same using grip handles provided on one or both ends which can extend beyond sides rails 30.

Figure 8:
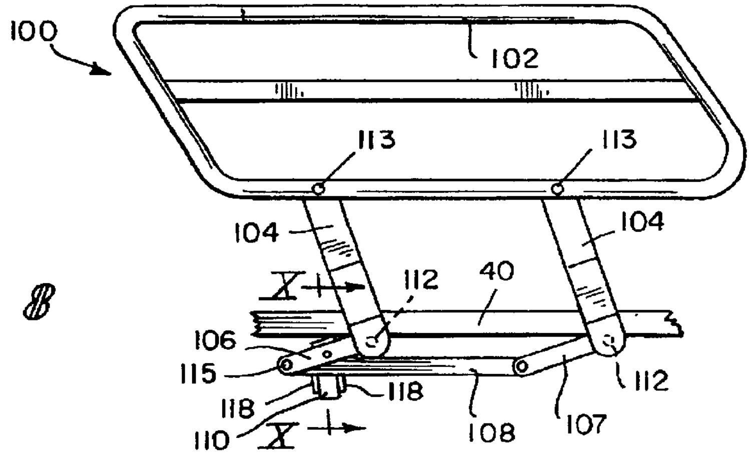
FIG. 8 is a side view of the siderail of FIG. 1, showing a siderail support linkage assembly in a locked position.
Figure 9:
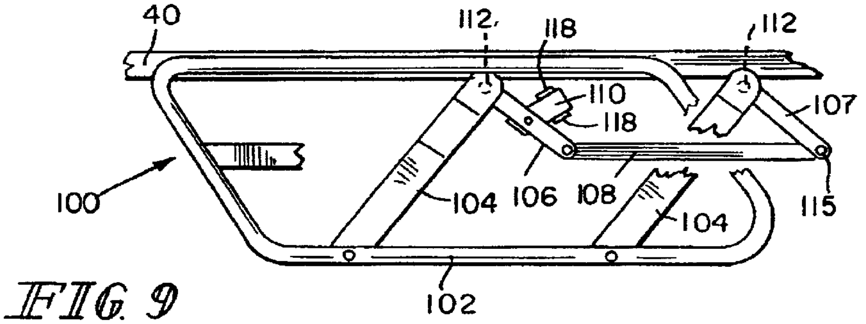
FIG. 9 is a side view showing the siderail support linkage of FIG. 8 in an unlocked position.

FIG. 8 is a side view of the siderail of FIG. 1, showing a siderail support linkage assembly in a locked position. FIG. 9 is a side view showing the siderail support linkage of FIG. 8 in an unlocked position. Bed frame 10 can include a siderail 100 that is movable between a latched or "up" position as shown in FIG. 8 and an unlatched or "down" position as shown in FIG. 9.

Siderail 100 includes a barrier 102 and a pair of main support arms 104 which are pivotally coupled at first ends to barrier 102 by pins 113. Siderail 100 is rotatably mounted to articulated support deck 16 by pivots 112 which are coupled between main support arms 104 and head deck portion 40. Parallelogram linkage arms 106 and 107 are rigidly coupled to main support arms 104. A parallelogram connecting arm 108 is pivotally coupled to linkage arms 106 and 107 by pins 115.

The barrier 102 can be pivoted in a counter-clockwise direction about pivots 112 and pins 113 from the latched or "up" position depicted in FIG. 8 to the unlatched or "down" position depicted in FIG. 9. As the main support arms 108 are pivoted about pivots 112, linkage arms 106 and 107 pivot together with connecting arm 108 so that the siderail latch 110 moves between locked and unlocked positions. Not shown is a conventional linkage which can be used to move the siderail assembly beneath the side of intermediate frame 14 when siderail barrier is in a "down" position.

Figure 10:
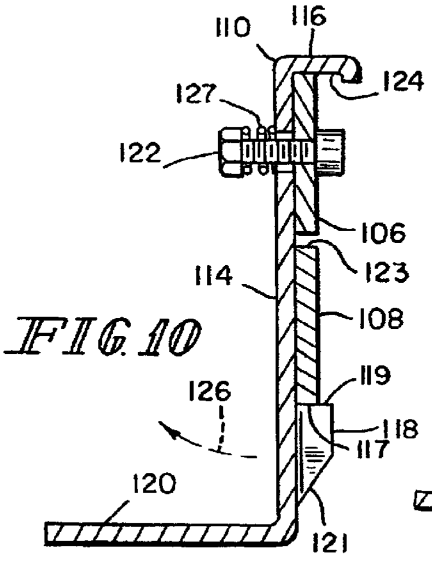
FIG. 10 is a cross-section view taken along line IX—IX of FIG. 8, showing the siderail latch in a locked position.
Figure 11:
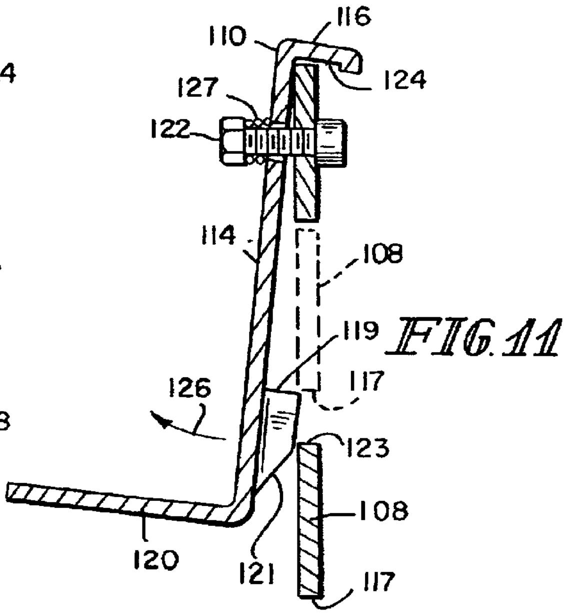
FIG. 11 is a cross-sectional view similar to FIG. 10, showing the siderail latch moved to an unlocked position.

FIG. 10 is a cross-section taken along line IX—IX of FIG. 8, showing the siderail latch locking the parallelogram support linkage assembly in the up position. FIG. 11 is a cross-section similar to FIG. 10, showing the siderail latch moved to an unlocked position. Siderail latch 110 is loosely coupled to linkage arm 106 by fastener 122. A spring element 127 is provided on fastener 122 as best shown in FIGS. 10 and 11. The force of the spring element acts between the head of the fastener 122 and siderail latch 110 and pulls linkage arm 106 toward and in contact with siderail latch 110 as shown.

Siderail latch 110 provides for releasably locking siderail 100 in the up position as shown best in FIGS. 8 and 10. Latch 110 includes a main body portion 114, a top flange 116, a pair of arm locking tabs 118 extending from body portion 114, and a bottom flange 120. Latch 110 is loosely coupled to linkage arm 106 by a fastener 122 as discussed above so that top flange 116 is adjacent a top edge 124 of linkage arm 106. When siderail 100 is rotated to the up position as shown in FIG. 8, a bottom surface 117 of connecting arm 108 is supported on top surfaces 119 of tabs 118 as shown in FIG. 10 to lock or block the siderail 100 in the up position. Spring element 127 biases body portion 114 of latch 110 toward connecting arm 108 (as depicted in FIG. 10) so that tabs 118 will be positioned to engage and support connecting arm 108. In an alternative embodiment, spring element 127 could be eliminated and the center of gravity of latch 110 could be relied upon to move latch 110 to a point beneath its support on edge 124 of linkage arm 106, in which case body portion 114 will tend to move toward arm 108 so that tabs 118 lock siderail 100 in the up position without any separate biasing mechanism.

Siderail 100 can be released from the up position by moving main body portion 114 in direction 126 as shown in FIGS. 10 and 11, so that connecting arm 108 can move downwardly past tabs 118 to allow siderail 100 to rotate on its support arms 104 away from the up position to a down position shown in FIG. 9.

Tabs 118 include bottom ramp surfaces 121 configured to engage a top surface 123 of connecting arm 108 as arm 108 moves upwardly from the solid position shown in FIG. 11 to the dotted position shown in FIG. 11. These ramp surfaces 121 cause main body 114 to move in the direction of arrow 126 automatically to permit the connecting arm 108 to move past tabs 118. When bottom surface 117 of connecting arm 108 moves past the top surface 119 of tabs 118, the main body 114 is urged by the force of spring element 127 into the position shown in FIG. 10 to lock the siderail 100 in the up position.

Figure 12:
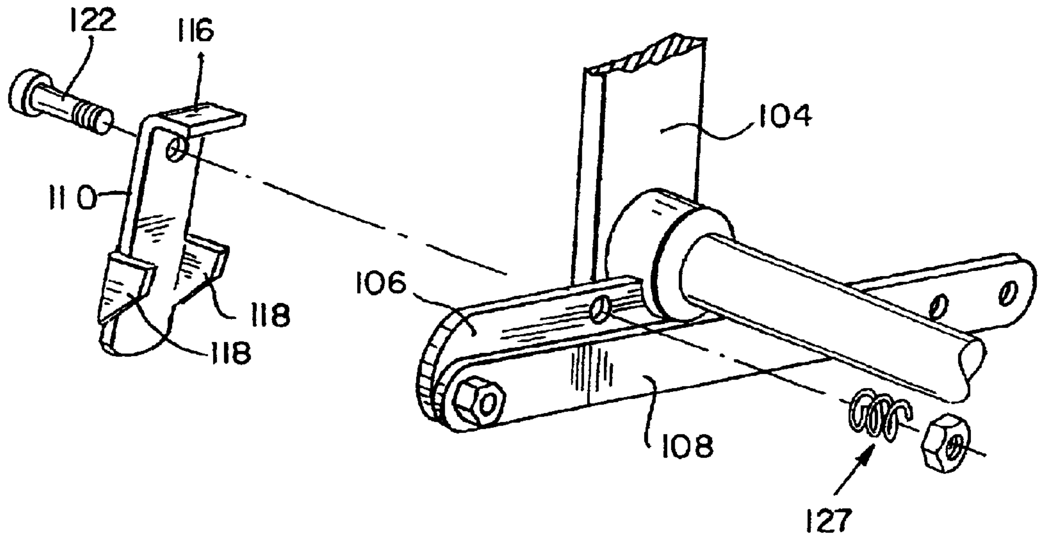
FIG. 12 is a perspective view of the siderail latch assembly.

FIG. 12 is an exploded perspective view of the siderail latch assembly. FIG. 12 shows how linkage arm 106 and connecting arm 108 could be aligned when the siderail 100 is in the up position. As can be seen from FIG. 12, when latch 110 is coupled to linkage arm 106, tabs 118 would extend beneath and hold connecting arm 108 into the locked or up position.

Figure 13:
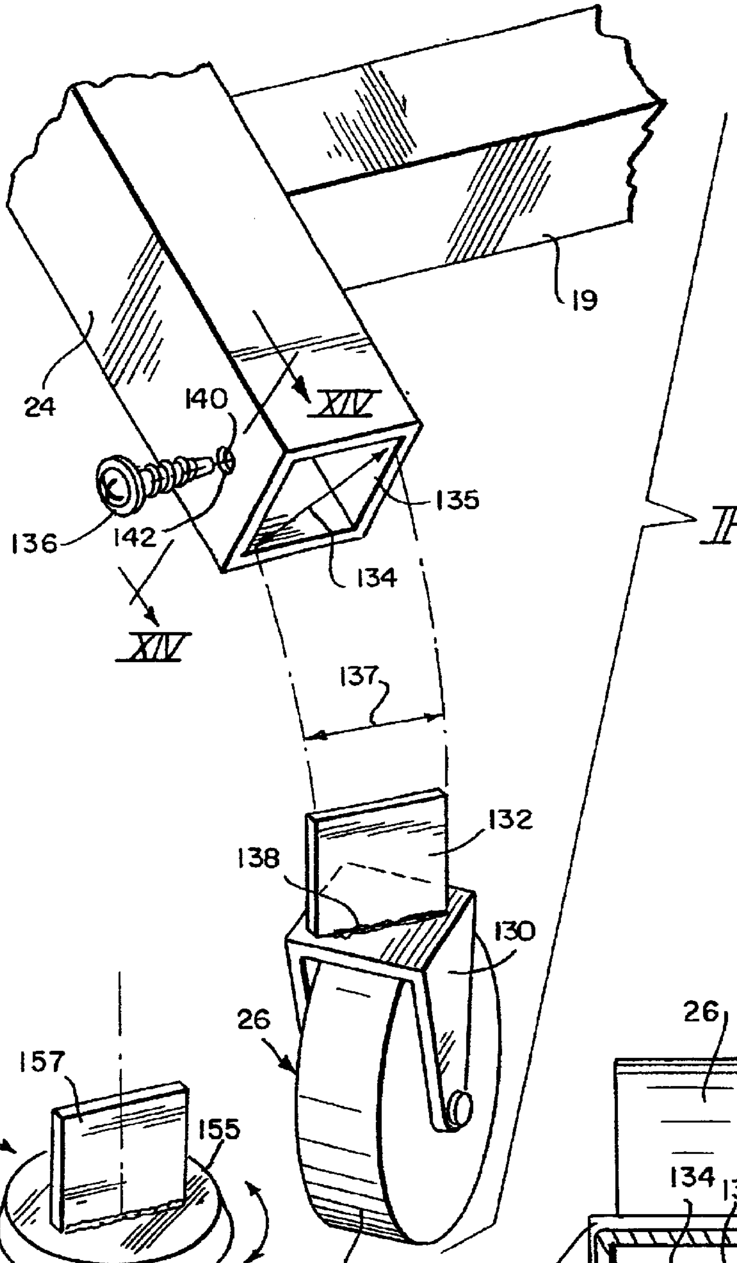
FIG. 13 is an exploded perspective view of the caster and a portion of the base frame of FIG. 1, showing a diagonal caster support plate and a caster retaining screw.
Figure 14:
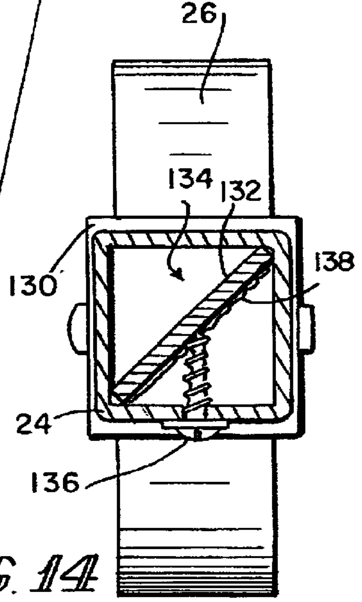
FIG. 14 is a cross-sectional view taken along line XIII—XIII of FIG. 13, showing the caster installed in the base frame.

FIG. 13 is an exploded perspective view of the caster and a portion of the base frame of FIG. 1, showing a diagonal caster support plate and a caster retaining screw. FIG. 14 is a cross-section taken along line XIII—XIII of FIG. 13, showing the caster installed into the base frame. According to one embodiment of the present invention, casters 26 can be coupled to base frame 12 as shown in FIGS. 13 and 14. In this embodiment, caster 26 includes a wheel 128, a wheel housing 130, and a diagonal mounting plate 132. Legs 24 of base frame 12 are formed from a metal tube having a substantially square opening 134 with a diagonal dimension 135 generally equal to a width dimension 137 of diagonal mounting plate 132. Diagonal plate 132 is coupled to caster housing 130 by a weld 138 which is hidden within leg 24 when caster 26 is installed to provide a low cost mounting mechanism that requires no extra finishing steps.

Caster 26 is installed into leg 24 by inserting diagonal plate 132 into opening 134, and then fixing caster 26 in place against vertical movement by a screw 136 that engages an edge 140 defining a threaded opening 142 in leg 24. An end of screw 136 exerts a lateral force against diagonal plate 132 to hold the caster 26 in the leg 24 as shown in FIG. 14.

Figure 15:
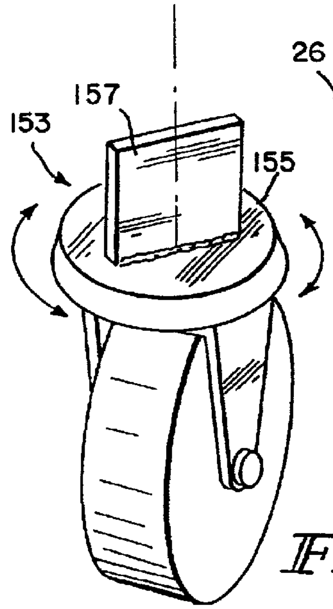
FIG. 15 is a perspective view of a swivel caster that can be used in conjunction with the present invention.

FIG. 15 is a perspective view of a swivel caster that can be used in conjunction with the present invention. The caster 153 of FIG. 15 includes a housing 155 that contains a conventional bearing swivel mechanism. A diagonal plate 157 similar to the diagonal plate 132 extends from housing 155 and is used to install swivel caster 153 into opening 134 of leg 24.

Figure 16:
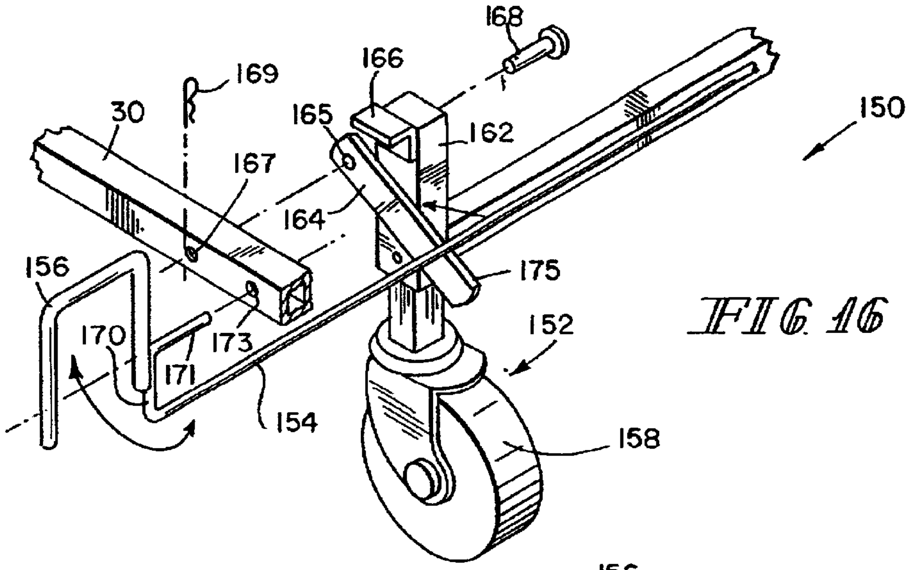
FIG. 16 is an exploded perspective view of an alternative embodiment of a caster assembly configured to be rotatably coupled to the intermediate frame.

FIG. 16 is an exploded perspective view of an alternative embodiment caster assembly configured to be rotatably coupled to an intermediate frame. Caster assembly 150 is configured to be coupled to intermediate frame 16 as shown in FIGS. 16–19. A separate caster assembly 150 is located adjacent the head and foot ends of the bed frame 10. Caster assembly 150 includes a pair of casters 152, a caster locking bar 154, and a caster engagement pedal 156 rigidly coupled to the locking bar 154. Half of caster assembly 150, with a single caster 152, is shown in FIG. 16. The other half of caster assembly 150 is a mirror image of the structure shown in FIG. 16. Caster 152 includes a wheel 158, a wheel housing 160, a support shaft 162, a diagonal support bar 164 welded to support shaft 162, and a top flange 166.

Caster assembly 150 provides casters 152 that can swing dow to support bed frame 10 on intermediate frame 14 or swing up to allow base frame 12 to support bed frame 10 as discussed hereafter. Diagonal support bar 164 of caster 152 is rotatably coupled to side beam 30 of intermediate frame 14 by a pin 168 which extends through an aperture 165 formed in bar 164 and through an aperture 167 formed in side beam 30. A locking clip 169 extends through an aperture in pin 168 to hold the pin 168 in place. Locking bar 154 has a U-shaped end portion 170 that is rotatably coupled to side beam 30. Illustratively, end 171 of locking bar 154 extends through an aperture 173 formed in side beam 30 to pivotally couple the locking bar 154 to the side beam 30. Pedal 156 is illustratively a U-shaped metal bar and is rigidly coupled to end portion 170, e.g., by a weld, to provide a simple, reliable, and inexpensive mechanism to allow an operator to rotate locking bar 154, e.g., by applying force with a foot.

Figure 17:
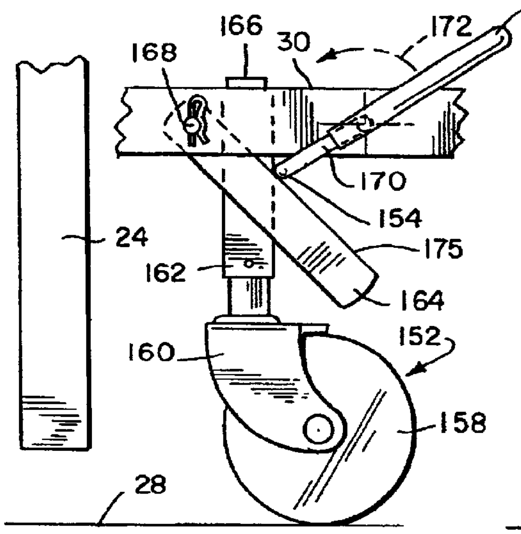
FIG. 17 is a side view of the caster assembly of FIG. 16, showing the caster locking bar in an engaged position.

FIG. 17 is a side view of the caster assembly of FIG. 16, showing the caster locking bar in an engaged position. Caster assembly 150 is in the lock position when caster support shaft 162 is vertical so that top flange 166 rests on a top surface of side beam 30 and locking bar 154 is rotated to be adjacent support shaft 162 as shown in FIG. 17. In this configuration, locking bar 154 engages a side surface 175 of support bar 164 to prevent caster 152 from rotating in a counter-clockwise direction, and top flange 166 engages the top surface of side beam 30 to prevent caster 152 from rotating in a clockwise direction. When intermediate frame 14 is in a lowered position, base frame legs 24 are kept above the ground 28 as shown in FIG. 17. If intermediate frame 14 is raised vertically relative to base frame 12, then base frame legs 24 can support bed frame 10 on ground 28 even when caster assembly 150 is in the locked position.

Figure 18:
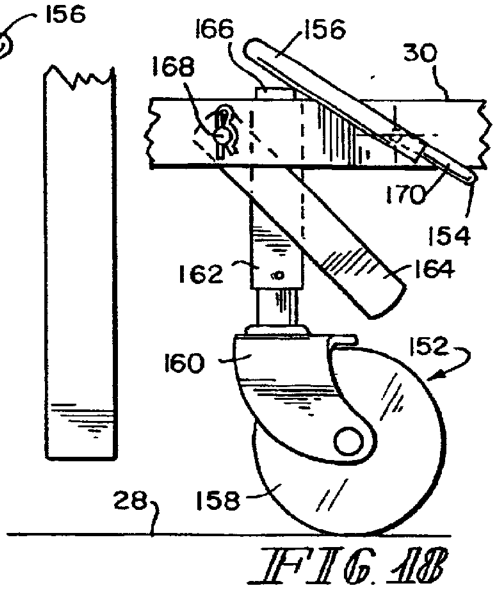
FIG. 18 is a side view similar to FIG. 17, showing the caster locking bar moved to a disengaged position.
Figure 19:
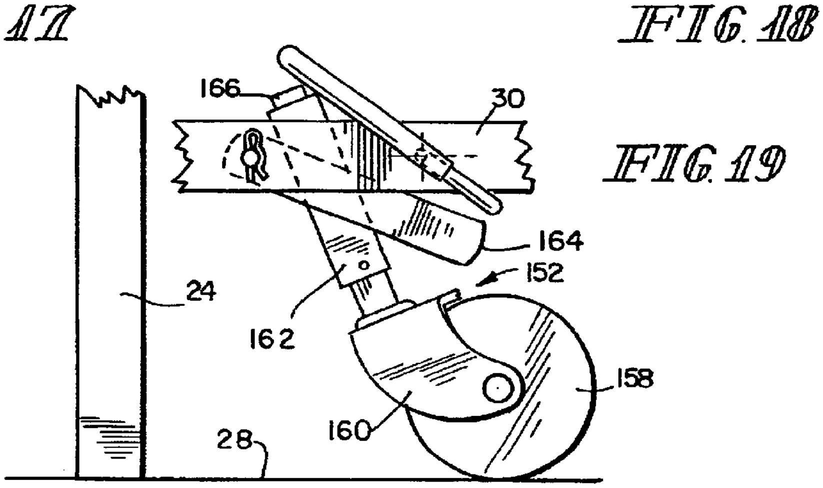
FIG. 19 is a side view similar to FIG. 18, showing the caster locking bar in a disengaged position with the legs of the base frame supported directly on the ground.

FIG. 18 is a side view similar to FIG. 17, showing the caster locking bar moved to a disengaged position. FIG. 19 is a side view similar to FIG. 18, showing the caster locking bar 154 in a disengaged position with the legs 24 of the base frame 12 supported directly on the ground 28. Caster assembly 150 is unlocked by rotating caster locking bar 154 via rotation of pedal 156 in direction 172 from the position as shown in FIG. 17 to the position as shown in FIG. 18. With caster locking bar 154 not restraining caster support shaft 162 by engaging support bar 164, caster 152 is free to rotate in a counter-clockwise direction as the intermediate frame 14 is lowered until leg 24 of base frame 12 engages ground 28 as shown in FIG. 19. This prevents the bed frame 10 from rolling. Caster assembly 50 can be reconfigured to engage ground 28 and support bed frame 10 by raising intermediate frame 14 until caster 152 can be moved to a vertical orientation, at which point pedal 156 is rotated to cause locking bar 154 to engage the support bar 164 and the support shaft 62 as shown in FIG. 17. Caster assembly 150 thus provides a mechanism whereby bed frame 10 can be selectively supported on casters 158 when intermediate frame 14 is in its lowermost position relative to base frame 12.

Figure 20:
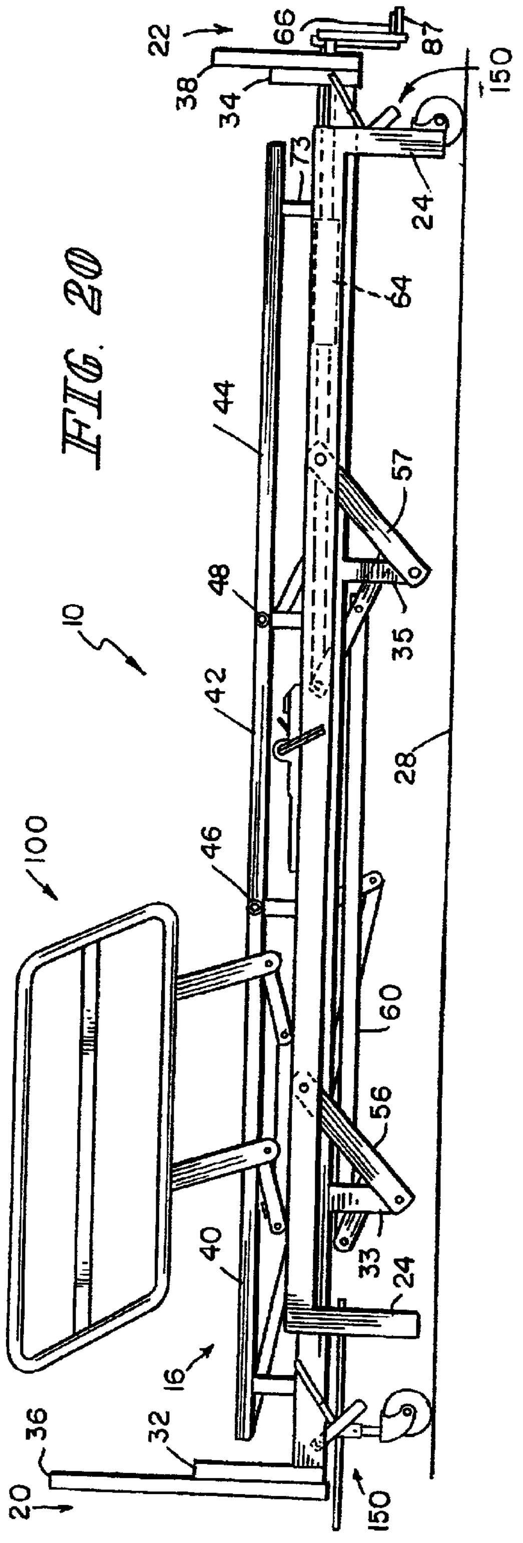
FIG. 20 is a side view similar to FIG. 1, showing the use of the caster assemblies of FIG. 16 supporting a bed frame.
Figure 21:
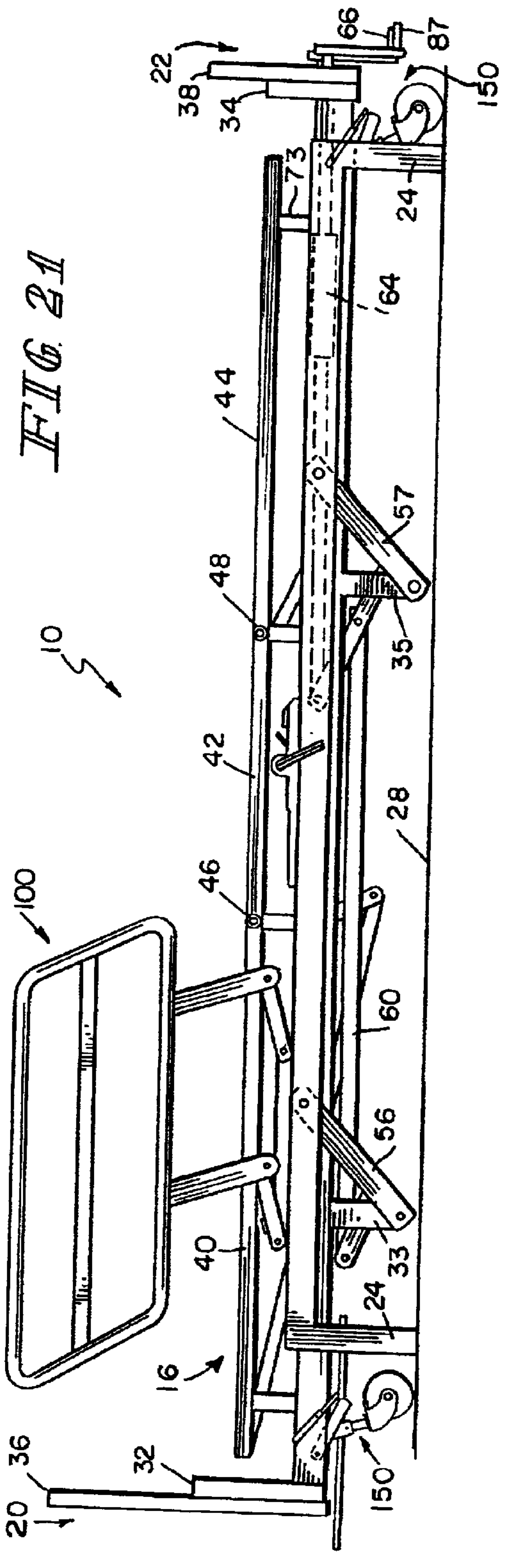
FIG. 21 is a side view similar to FIG. 20, showing the caster assemblies in disengaged positions in which the legs of the bed frame are on the ground.

FIG. 20 is a side view similar to FIG. 1, showing the use of caster assemblies of FIG. 16 supporting a bed frame. FIG. 21 is a side view similar to FIG. 20, showing the caster assemblies in disengaged positions in which the bed frame is on the ground. FIGS. 20 and 21 depict how the caster assemblies of FIG. 16 can be coupled to the intermediate frame 14 and used to support the bed frame 10 on the legs 24 of the base frame 12.

FIG. 22 is a plan view of a bed frame according to the present invention showing an articulated support deck having head, seat, and foot deck portions that are coupled together for articulation by pivots recessed from edges of the deck portions. As discussed above, articulated support deck 16 includes a head deck portion 40, a seat deck portion 42, and a foot deck portion 44 that are coupled together by a head-seat pivot 46 and a seat-foot pivot 48. As shown in FIG. 22, deck portions 40,42 and 44 have radiused corners 50 adjacent pivots 46 and 48. These radiused corners reduce the possibility of pinching during articulation of articulated support deck 16. As further shown, head and foot deck portions 40 and 44 have wedge-shaped corners 52 adjacent head and foot ends 20 and 22, respectively. Wedge corners 52 allow for access to end posts 32 and 34 which, when they are formed from tubes, can serve as sockets for an i.v. stand or other equipment (not shown). Wedge corners 52 illustratively allow the use of mattresses with different lengths on the deck.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed is:

1. A caster assembly for a bed frame which comprises:

casters which are coupled to support shafts;

support bars which are rigidly attached to the support shafts and pivotally coupled to frame members of a bed frame; and locking bars which are movable between:

a first position in which portions of the locking bars engage the support bars and lock the support shafts in a vertical position; and a second position in which the locking bars are clear of the support bars so that the support shafts are free to pivot about the frame members, wherein each locking bar affects the engagement of support bars of at least a pair of the casters.

2. A caster assembly according to claim 1, wherein the support shafts include flanges which engage the frame members and limit the pivotal movement of the support bars.

3. A caster assembly according to claim 1, wherein the locking bars include pedals by which the locking bars can be pivoted between the first and second positions.

4. A caster assembly according to claim 3, wherein each pedal comprises a U-shaped member positioned at an end of the locking bar.

5. A caster assembly according to claim 1, wherein the locking bars are rotatably coupled to the frame members of the bed frame.

6. A caster assembly for a bed frame, the caster assembly comprising:

a caster;

a support shaft coupled to the caster;

a support bar rigidly attached to one of the support shaft and a frame member of a bed frame, the support bar being pivotally coupled to the other of the support shaft and the frame member;

a locking bar configured to move between a first position in which a portion of the locking bar engages the support bar and locks the support shaft in a locked position, and a second position in which the locking bar is clear of the caster, the support haft, and the support bar so that the support shaft is free to pivot in at least a first direct on about the frame member; and wherein the locking bar is configured to engage a pair of the support bars supported by a pair of the casters.

7. The caster assembly according to claim 6, wherein the support shaft includes at least one flange configured to engage the frame member and prevent pivotal movement of the support shaft in a second direction opposite the first direction.

8. The caster assembly according to claim 6, wherein the locking bar includes a pedal by which the locking bar can be pivoted between the first position and the second position.

9. The caster assembly according to claim 8, wherein the pedal comprises a U-shaped member positioned at an end of the locking bar.

10. The caster assembly according to claim 6, wherein the locking bar is rotatably coupled to the frame member of the bed frame.

11. A caster assembly comprising:

a housing;

a wheel rotatably supported by the housing;

a support shaft coupled to the housing and supported for selective pivotal movement relative to a frame member of a bed frame;

a support bar coupled to the support shaft;

a locking bar configured to move between a first position in which the locking bar engages the support bar and the support shaft is prevented from pivoting movement in at least a first direction, and a second position in which the locking bar does not engage the wheel, the support shaft, and the support bar, such that the support shaft is capable of pivoting movement in at least a first direction toward the locking bar; and wherein the locking bar is configured to engage a pair of the support bars supported by a pair of the wheels.

12. The caster assembly according to claim 11, wherein the support shaft includes at least one flange configured to engage th frame member and prevent pivotal movement of the support shaft in a second direction opposite the first direction.

13. The caster assembly according to claim 11, wherein the locking bar includes a pedal by which the locking bar can be pivoted between the first position and the second position.

14. A caster assembly according claim 11, wherein the locking bar is rotatably coupled to the frame member of the be frame.

15. A caster assembly for a bed including a support deck, a base frame, and an intermediate frame coupled to the base frame an configured to move vertically relative to the base frame, the caster assembly comprising:

a caster;

a support shaft coupled to the caster and coupled to the intermediate frame for pivotal movement relative to a ground surface between a lowered position and a raised position, wherein the support deck is supported by the intermediate frame when the support shaft is in the lowered position and the support deck is supported by the bas frame when the support shaft is in the raised position; and a locking member operably associated with the support shaft and configured to move between a first position in which the locking member is operably coupled to the support shaft to prevent the support shaft from pivotally moving in at least a first direction from the lowered position to the raised position, and a second position in which the locking member is not operably coupled to the support shaft to allow the support shaft to pivotally move in at least the first direction from the lowered position to the raised position as the intermediate frame is lowered until the base frame engages the ground surface.

16. The caster assembly according to claim 15, further comprising an engagement member operably associated with the support shaft and configured to prevent the support shaft from pivotally moving in a second direction opposite the first direction.

17. The caster assembly according to claim 16, wherein the engagement member comprises at least one flange coupled to the support shaft.

* * * * *